(12) United States Patent  
Goel et al.

(10) Patent No.: US 7,907,707 B2  
(45) Date of Patent: Mar. 15, 2011

(54) TECHNIQUES FOR STORING REAL-TIME VOICE MESSAGES IN A CALLER'S VOICEMAIL BOX

(75) Inventors: Vineet Goel, Santa Clara, CA (US); Aseem Asthana, San Jose, CA (US); Ashish Chotai, Santa Clara, CA (US); Sravan Vadlakonda, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1105 days.

(21) Appl. No.: 11/448,286

(22) Filed: Jun. 7, 2006

(65) Prior Publication Data

US 2007/0286356 A1    Dec. 13, 2007

(51) Int. Cl.  
*H04M 1/64* (2006.01)  
*H04M 1/24* (2006.01)  
(52) U.S. Cl. .................... 379/88.25; 379/88.18  
(58) Field of Classification Search .......... 379/67.1, 379/68, 88.22–88.27, 85–87  
See application file for complete search history.

(56) References Cited

U.S. PATENT DOCUMENTS

| | | | |
|---|---|---|---|
| RE40,845 E * | 7/2009 | Ouchi | 358/402 |
| 2003/0142799 A1 | 7/2003 | Candell et al. | |
| 2006/0072726 A1 * | 4/2006 | Klein et al. | 379/201.01 |
| 2006/0256949 A1 * | 11/2006 | Noble, Jr. | 379/265.01 |
| 2007/0274466 A1 * | 11/2007 | Tidwell et al. | 379/67.1 |

OTHER PUBLICATIONS

IBM Software—Lotus Domino Unified Communications Services, http://www-142.ibm.com/software/sw-lotus/products/product4.nsf/wdocs/ducsfaq; 4 pages.

* cited by examiner

*Primary Examiner* — Fan Tsang  
*Assistant Examiner* — Solomon Bezuayehu  
(74) *Attorney, Agent, or Firm* — Fish & Richardson P.C.

(57) ABSTRACT

Techniques for storing voicemails in real-time in a caller's voicemail system when a voicemail is left in a callee's voicemail system are provided. A connection to the callee's voicemail system is detected during a call from the caller to the callee. When a voicemail is being left on the caller's voicemail system, a copy of the voicemail message is automatically forked to the caller's voicemail system. Thus, when a voicemail message is recorded on the callee's voicemail system, a copy of the voicemail message is also stored on the caller's voicemail system.

21 Claims, 5 Drawing Sheets

TECHNIQUES FOR STORING REAL-TIME VOICE MESSAGES IN A CALLER'S VOICEMAIL BOX

BACKGROUND OF THE INVENTION

Embodiments of the present invention generally relate to telecommunications and more specifically to techniques for storing real-time voice messages in a caller's voicemail.

When a caller calls a callee and the callee does not answer the call, a voicemail system may answer the call. The voicemail system allows the caller to leave a voicemail message for the callee. When the caller is finished leaving the voicemail message, the connection to the callee's voicemail system is ended. After ending the connection, the caller cannot access the voicemail message again after leaving it. Rather, the voicemail message is stored in the callee's inbox and accessible to the callee.

Also, a caller may record a voicemail and send it to a callee in an offline fashion. This message is stored in the caller's outbox and sent at a later time. The message is recorded offline in that the caller is not connected to the callee's voicemail system in real-time while it is being recorded. However, most communications occur with a caller calling a callee and being connected to the callee's voicemail system in real-time. Thus, as described above, the voicemail message is saved in the callee's voicemail system and is not accessible to the caller after the connection is ended.

DETAILED DESCRIPTION OF EMBODIMENTS OF THE INVENTION

Embodiments of the present invention provide techniques for storing voicemails in real-time in a caller's voicemail system when a voicemail is left in a callee's voicemail system. A connection to the callee's voicemail system is detected during a call from the caller to the callee. When a voicemail message is being left on the callee's voicemail system, a copy of the voicemail message is automatically forked to the caller's voicemail system. Thus, when a voicemail is recorded on the callee's voicemail system, a copy of the voicemail message is also stored on the caller's voicemail system.

Figure 1:
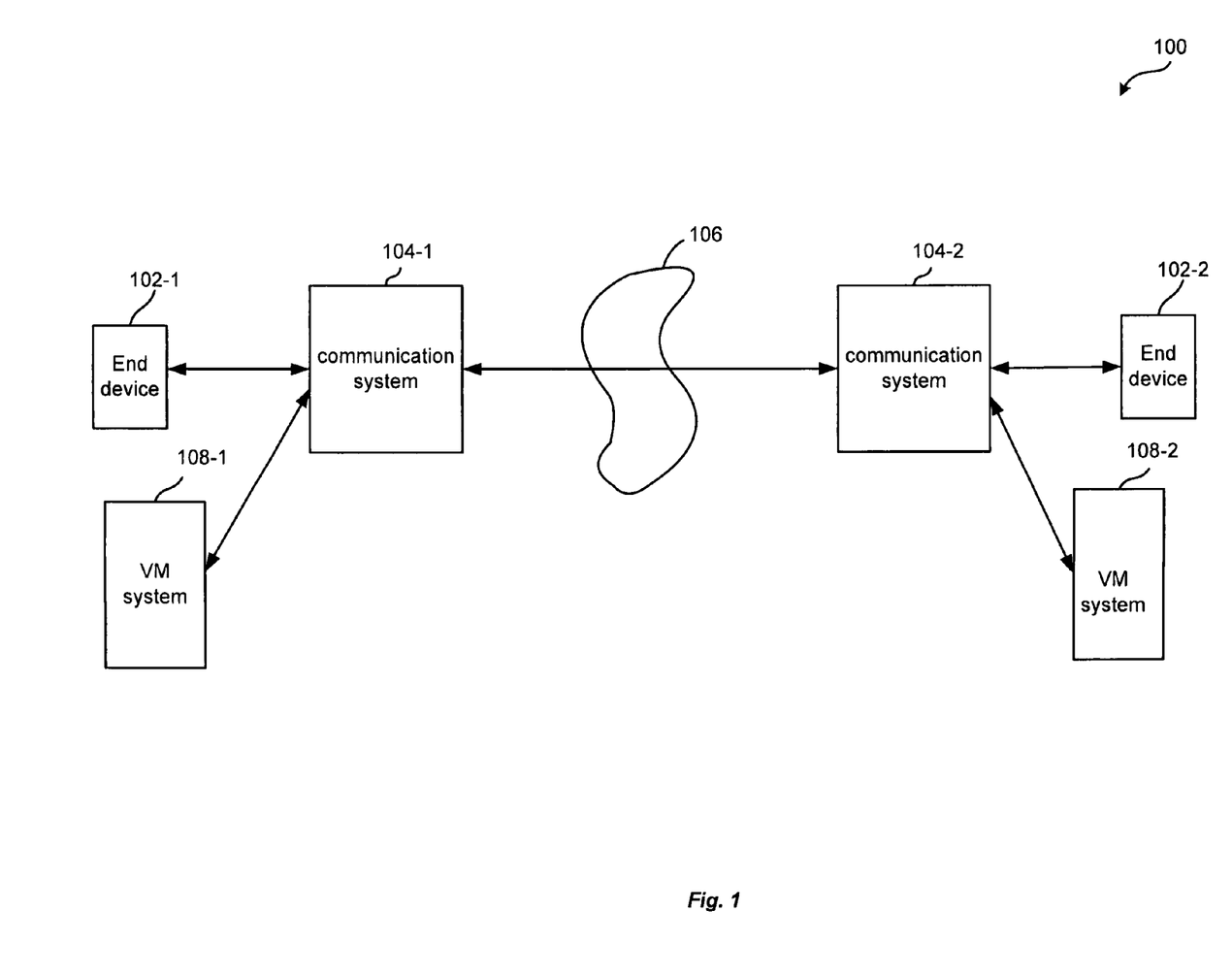
FIG. 1 depicts a system for providing real-time storing of voicemails on a caller's voicemail system according to one embodiment of the present invention.

FIG. 1 depicts a system 100 for providing real-time storing of voicemails on a caller's voicemail system according to one embodiment of the present invention. As shown, system 100 includes a caller end device 102-1, a voice communication system 104-1, a network 106, a voice communication system 104-2, a callee end device 102-2, a voicemail system 108-1, and a voicemail system 108-2. It will be recognized that variations of system 100 will be appreciated by a person skilled in the art.

End devices 102 include any communication devices. For example, end devices 102 include cellular telephones, public switched telephone network (PSTN) telephones, internet protocol (IP) telephones, computers, soft phones, instant message clients with voice capability, or any other device capable of providing voice communications.

Voice communication system 104 will include any communication system capable of routing communications between end device 102-1 and end device 102-2. For example, voice communication system 104 includes a private branch exchange (PBX), where the PBX may be a PSTN PBX or IP PBX. Further, voice communication system 104 may be a unified media server, video-conferencing system, etc.

Network 106 may be any network. For example, network 106 may be a PSTN or IP network.

Voicemail system 108 may be any voicemail system. Voicemail system 108 is configured to store voicemail messages for a user. For example, voicemail system 108-1 may store voicemail messages for a caller and voicemail system 108-2 may store voicemail messages for a callee. When a user's voicemail system is described, it will be understood that a user's voicemail system may be an account maintained by the voicemail system. For example, the account may store voicemail messages for a specific user and only be accessible using the user's credentials. The user can access the account and perform actions as known in the art. Although two voicemail systems 108-1 and 108-2 are shown, it will be recognized that only one voicemail system may be provided, or the functions described may be distributed in any number of voicemail systems.

Voicemail system 108 may be any voicemail system. Also, voicemail system 108 may include an answering machine, any answering service, unified messaging system, or any other device that is configured to store voicemail messages.

A voicemail message may be any media that is recorded by voicemail system 108. For example, the media may be voice, data, video, or any combination thereof. For example, a video voicemail message may be left, a picture may be sent, etc. or any other data.

Caller end device 102-1 is configured to initiate a communication (referred to as a call) to a callee end device 102-2. A call may be any communication from end device 102-1 to end device 102-2. For example, a first user (referred to as a caller) calls a second user (referred to as a callee). When a callee does not answer the call, then the call is routed to voicemail system 108-2. For example, the call may go from caller end device 102-1 to voice communication system 104-1. Voice communication system 104-1 then routes the communication through network 106 to voice communication system 104-2. Voice communication system 104-2 determines if the communication is for the callee and thus routes the communication to callee end device 102-2. In this case, callee end device 102-2 may ring or may output any other signal that indicates an incoming call. As is known in the art, when a callee does not answer the call, it is redirected or routed to voicemail system 108-2. For example, voice communication system 104-2 routes the communication to voicemail system 108-2.

Voicemail system 108-2 may provide the caller options in leaving voicemail messages. For example, after traversing a menu, a caller may select an option to leave a voicemail message. For example, the caller may press 1 to leave a voicemail message. Also, after a certain time period elapses, caller may be able to leave a voicemail message automatically. In one embodiment, a signal is sent from voicemail system 108-2 to end device 102-1 indicating that the caller should leave a voicemail message after the signal. For example, a sound, such as a beep, may be sent to end device 102-1. After the signal is sent, then media is recorded for the voicemail message. For example, any media spoken by a caller is sent from end device 102-1 and recorded by voicemail system 108-2 as a voicemail message.

Thus, a caller leaves a voicemail message for the callee on voicemail system 108-2. For example, the caller may speak into end device 102-1, which sends media from end device 102-1 to voicemail system 108-2. Any media sent by end device 102-1 is then recorded as a voicemail message. A signal may be sent by end device 102-1 indicating that the voicemail message is finished. For example, the user may select a key on end device 102-1, such as "#", to end the voicemail message. Alternatively, a caller may end the connection to the voicemail system 108-2 by hanging up or terminating the connection. The voicemail message may terminate at that point.

Embodiments of the present invention store a copy of the voicemail message that is recorded by voicemail system 108-2 in the caller's voicemail system 108-1. This is in addition to the conventional storing of the voicemail message in the callee's voicemail system 108-2. For example, a copy of the media is forked to voicemail system 108-1 while it is being sent to voicemail system 108-2. Thus, while a voicemail message is being recorded for the callee, it is being recorded for the caller's voicemail system 108-1. Accordingly, in real-time, a voicemail message is recorded for the callee's voicemail system 108-1.

When a caller finishes recording the voicemail message, a copy may be stored in voicemail system 108-2. Also, because a copy of the voicemail message was forked to voicemail 108-1, a copy of the voicemail message is also stored in real-time in voicemail system 108-1.

In one embodiment, a copy of the voicemail message in voicemail system 108-1 can be stored in a caller's outbox. It will be recognized that the voicemail message may also be stored in any other area of voicemail system 108-1 that is accessible to the caller. The caller can then perform any actions with the voicemail message that is stored in the caller's voicemail system 108-2. For example, the caller may review the voicemail message. Also, the caller may forward the voicemail message to another user. Further, the voicemail message may be forwarded to another messaging system, such an a unified messaging system or email system. Thus, after the caller is disconnected from the callee's voicemail system 108-2, the caller still has access to a copy of the voicemail message that was left while the caller was connected to the callee's voicemail system 108-2.

Accordingly, a caller actively connects to a callee and when the caller is re-routed to the callee's voicemail system 108-2 and leaves the callee a voicemail message, a copy of the voicemail message is recorded for the caller's voicemail system 108-1. This is done while the caller is online and in real-time. Because most communications occur when a caller calls a callee and is re-directed to a voicemail system for the callee, embodiments of the present invention are useful because a copy of the voicemail is stored in the caller's voicemail system 108-1. This is very useful if regulations require that a copy of voicemail messages should be saved. For example, certain regulations, such as Sarbanes-Oxley, require a copy of communications to be saved. By having a copy of voicemail message saved in real-time in voicemail system 108-1, companies can follow the regulations. Further, a caller can perform other options after leaving a voicemail message. For example, the caller may want to forward the same voicemail to other users. Thus, instead of calling another user and leaving the same voicemail message, the caller can forward the stored voicemail message to the second user.

Figure 2:
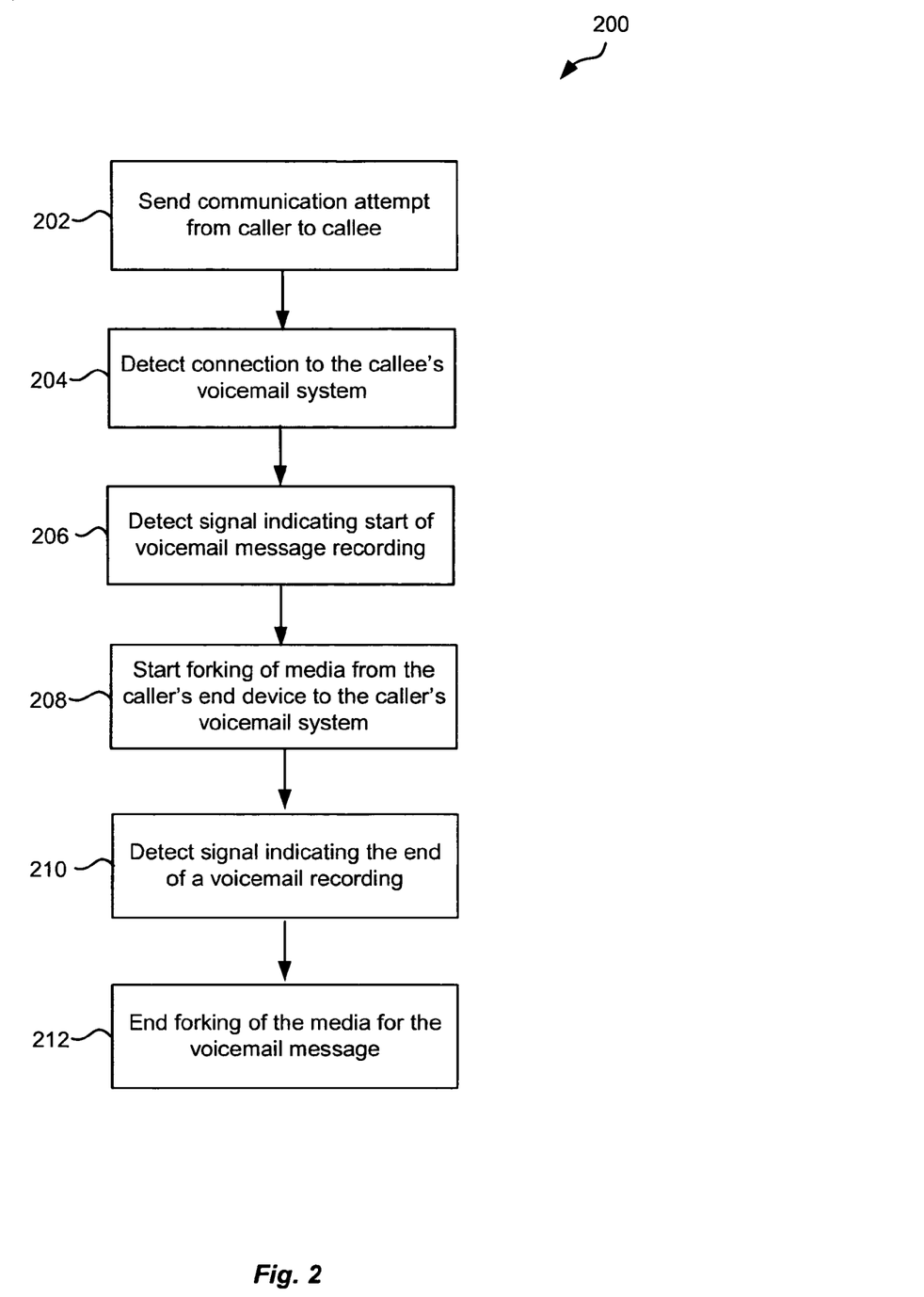
FIG. 2 depicts a simplified flowchart of a method for storing voicemail messages in real-time according to one embodiment of the present invention.

FIG. 2 depicts a simplified flowchart 200 of a method for storing voicemail messages in real-time according to one embodiment of the present invention. Step 202 sends a communication attempt from a caller to a callee. For example, a phone call may be made from end device 102-1 for end device 102-2.

Step 204 detects a connection to the callee's voicemail system 108-2. For example, the communication attempt after ringing a certain number of times may be redirected to the callee's voicemail system 108-2.

Step 206 detects a signal indicating the start of a voicemail message recording. For example, a beep may be detected.

Step 208 then starts a forking of media from the caller's end device 102-2 to the caller's voicemail system 108-1. This forking is done as a voicemail message is being recorded. As the media is being sent to the callee's voicemail system 108-2, the media is also forked in real-time to the caller's voicemail system 108-1.

Step 210 detects a signal indicating the end of a voicemail recording. For example, the caller may hang up or may select a key that sends a signal indicating the end of the voicemail recording.

Step 212 then ends the forking of the media for the voicemail message to the caller's voicemail system 108-1. The voicemail message that was forked to the caller's voicemail system 108-1 then may be stored in the caller's voicemail account, such as in the caller's outbox.

Embodiments of the present invention may store a voicemail message in the caller's voicemail system 108-1 in various ways. The following will describe three different embodiments of storing voicemail messages in the caller's voicemail system 108-1; however, it will be recognized that embodiments of the present invention are not limited to these variations and other variations may be appreciated.

Figure 3:
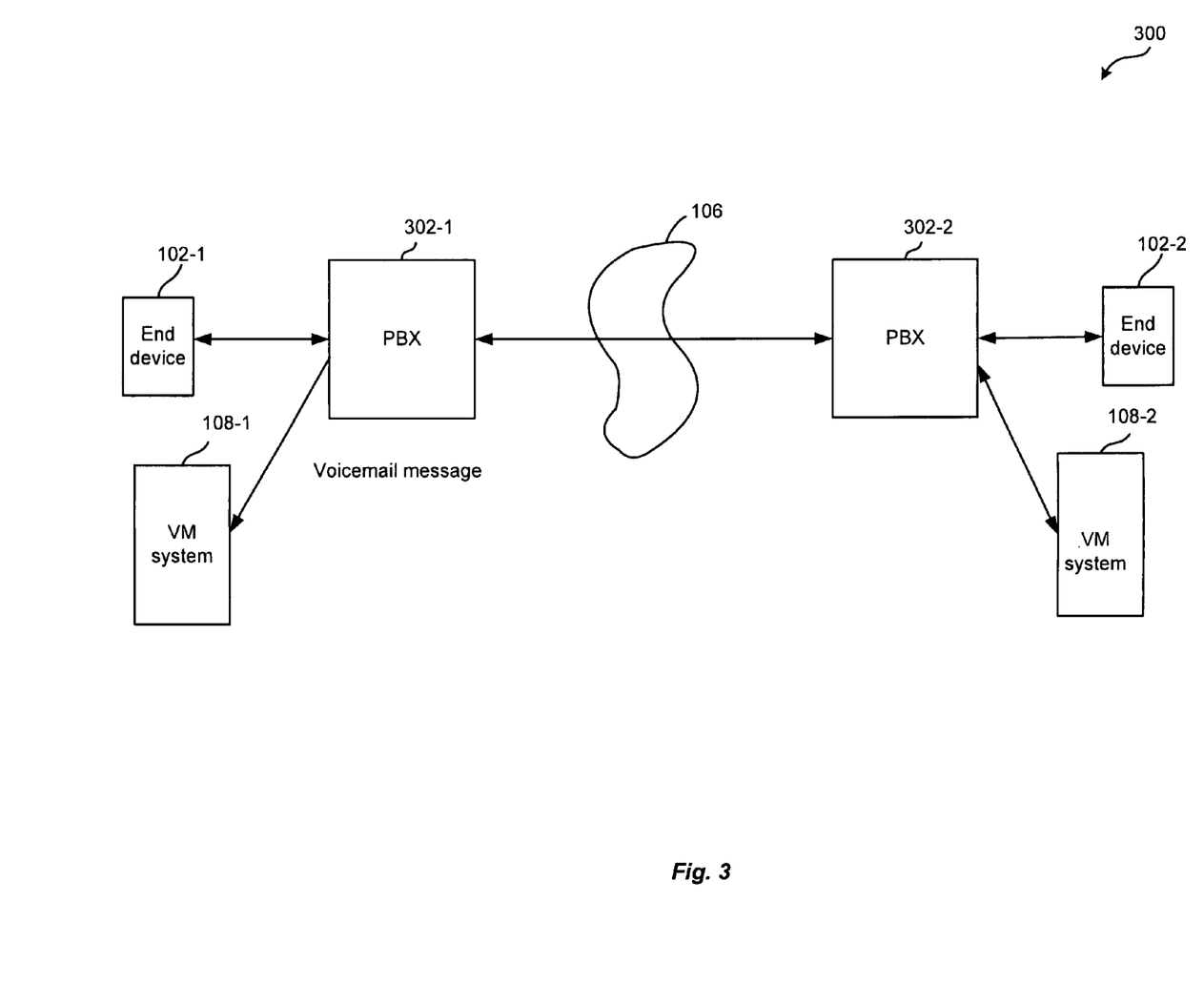
FIG. 3 depicts a system for storing voicemail messages in the caller's voicemail system using a PSTN system according to one embodiment of the present invention.

FIG. 3 depicts a system 300 for storing voicemail messages in the caller's voicemail system 108-1 using a PSTN system according to one embodiment of the present invention. As shown, voice communications system 104-1 is a private branch exchange (PBX) 302-1. When PBX 302-1 receives a call request towards the callee from caller end device 102-1, it automatically forks a call leg towards the caller's voicemail system 108-1.

For example, PBX 302-1 initiates a communication or call to the caller's voicemail system 108-1. Thus, PBX 302-1 can connect to the caller's voicemail system 108-1. The connection may be made using the caller's voicemail access information, such as a voicemail number.

The call is also sent to the callee's end device 102-2. If the call is picked up by the callee, then the connection to the caller's voicemail system 108-1 may be torn down or disconnected. In another embodiment, PBX 302-1 may wait until the call is redirected to the callee's voicemail system 108-2 call before connecting to the caller's voicemail system 108-1.

When the call is connected to the callee's voicemail system 108-2 and a signal is received at PBX 302-1, such as a beep or any other signaling indication that the call has been forwarded to voicemail and it is time for the caller to leave a voicemail, PBX 302-1 forks media received from end device 102-1 to the caller's voicemail system 108-1. Thus, as the media flows for the voicemail message, it is sent to the callee's voicemail system 108-2 and also forked to the caller's voicemail system 108-1.

In one embodiment, if the callee picks up end device 102-1, the call that was forked to voicemail system 108-1 may be torn down. This is because a voicemail message will not be left because the callee has answered and a normal communication between caller and callee will proceed. In another embodiment, PBX 302-1 may wait until a call is redirected to voicemail system 108-2 before forking a communication to a caller's voicemail system 108-1.

PBX 302-1 then forks the media for the voicemail message to the caller's voicemail system 108-1. When the caller is finished leaving the voicemail message, a copy of the voicemail message is saved in the caller's voicemail system 108-1.

Figure 4:
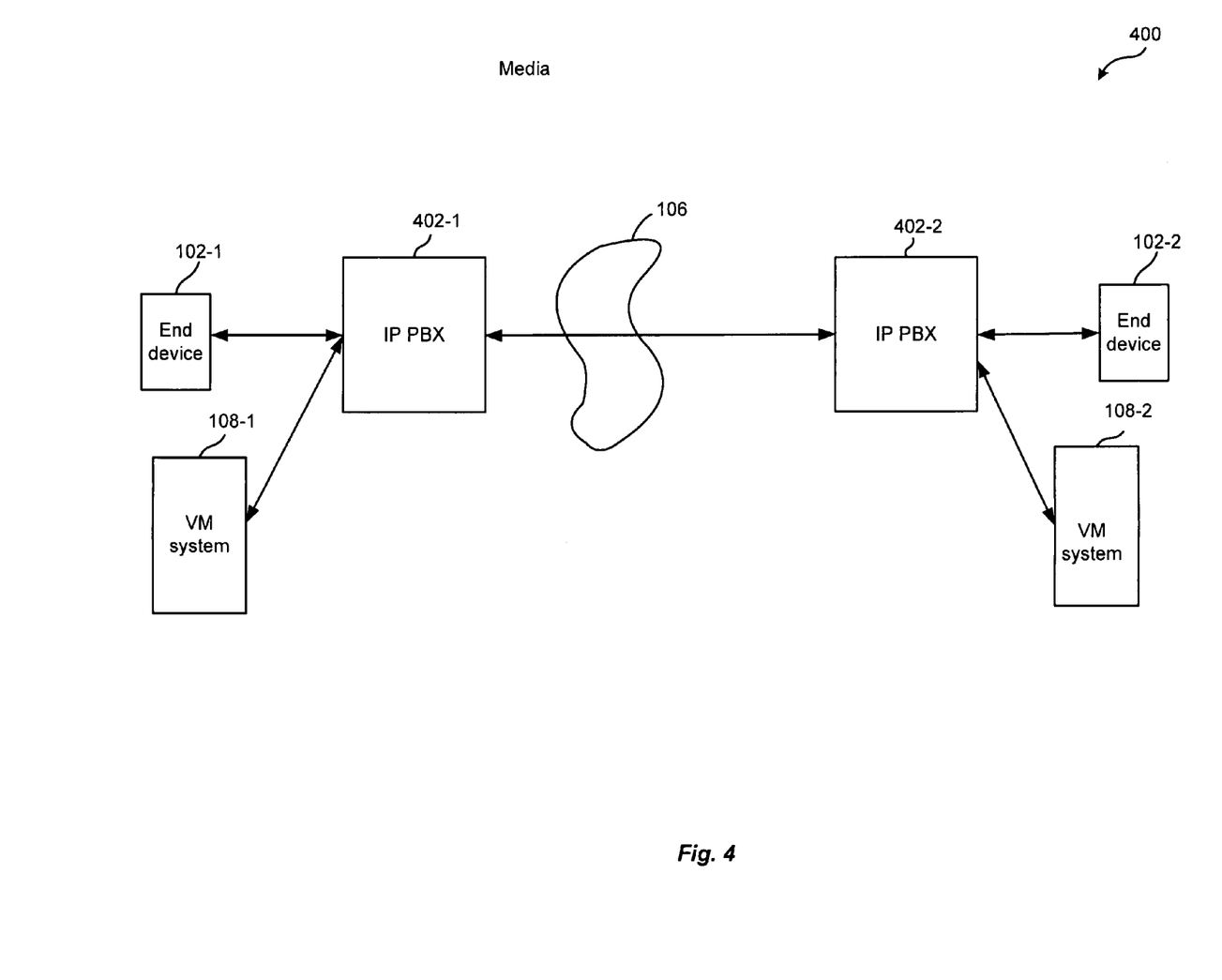
FIG. 4 shows a system for storing voicemail messages in a caller's voicemail system using an IP communication system according to one embodiment of the present invention.

FIG. 4 shows a system 400 for storing voicemail messages in a caller's voicemail system 108-1 using an IP communication system according to one embodiment of the present invention. As shown, voice communication system 104-1 is replaced by an IP PBX 402-1.

In one embodiment, IP PBX 402-1 and IP PBX 402-2 set up the call. IP PBX 402-1 receives a call request from the caller's end device 102-1. The call request is then referred to IP PBX 402-2.

IP PBX 402-2 then sends the call request to end device 102-2. If end device 102-2 is not picked up by the callee, IP PBX 104-2 sends the call to the callee's voicemail system 108-2. Voicemail system 108-2 may then send an indication back towards the caller's end device 102-1 indicating that a voicemail should be recorded.

In one embodiment, media flows from end device 102-1 to end device 102-2. This media may or may not flow through IP PBX 402-1. For example, the media may flow from end device 102-1 to end device 102-2 without going through IP PBXs 402-1 and 402-2. Embodiments of the present invention allow media for the voicemail to be forked to the callee's voicemail system 108-1 in many ways. For example, the media may be sent through IP PBX 402-1 (as shown), which can then fork the media to the caller's voicemail system 108-1. Also, other scenarios not shown include a media server or any other device that the media flows through may be used to fork the media. In another embodiment, end device 102-1 may even fork the media to the caller's voicemail system 108-1.

When a voicemail indication is received, whichever device that is designated to fork the media, starts forking any media that is received from the caller's end device 102-1 to the caller's voicemail system 108-1. Thus, a voicemail message that is recorded for the callee's voicemail system 108-2 is also recorded in the caller's voicemail system 108-1 using media server 404.

Figure 5:
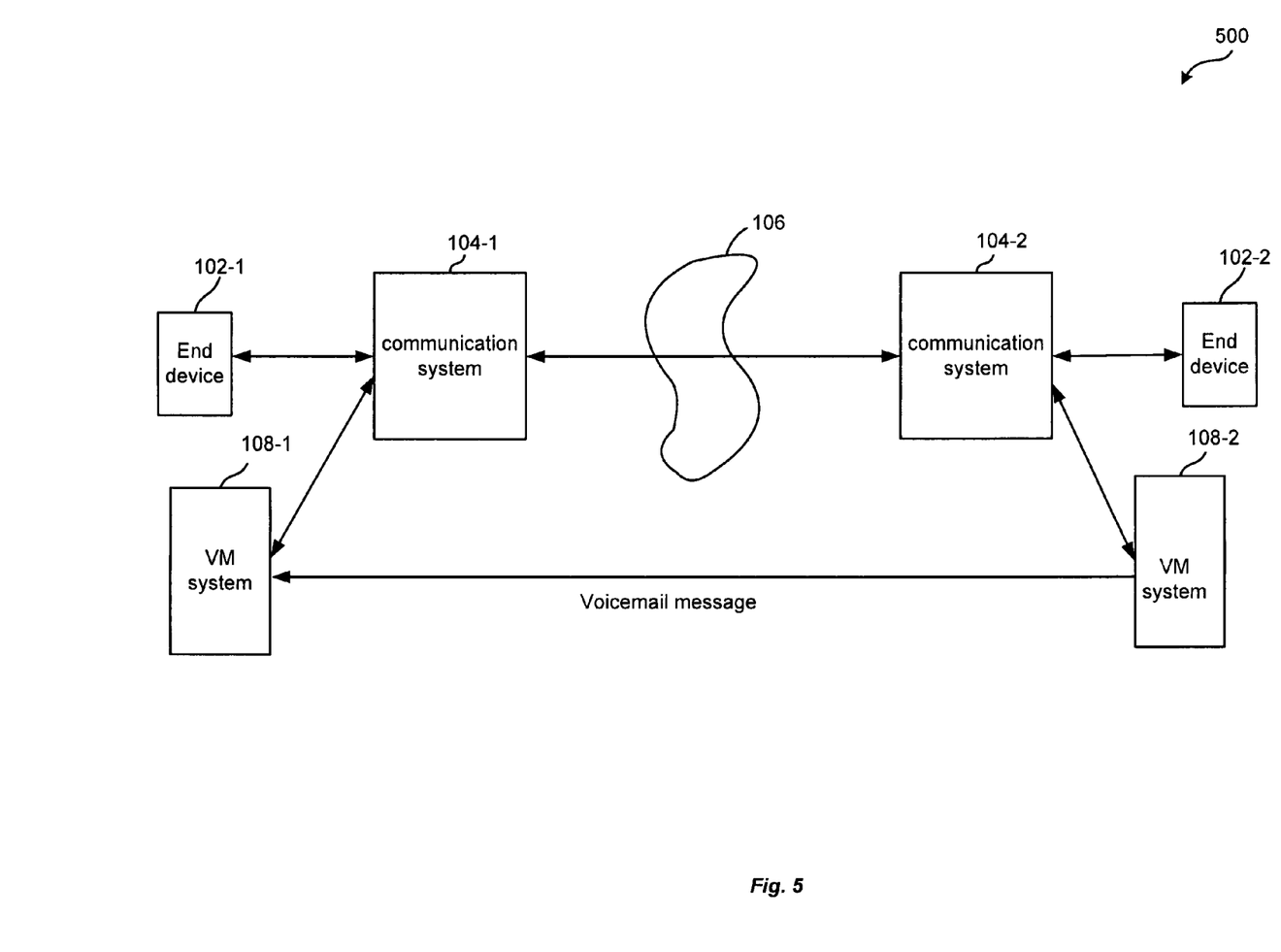
FIG. 5 depicts a system for storing voicemail messages in a caller's voicemail system 108-1 using the callee's voicemail system according to one embodiment of the present invention.

FIG. 5 depicts a system 500 for storing voicemail messages in a caller's voicemail system 108-1 using the callee's voicemail system 108-2 according to one embodiment of the present invention. When a callee's voicemail system 108-2 receives media from the caller leaving a voicemail message, the media may be sent to the caller's voicemail system 108-1. In one embodiment, the media may be sent in real-time or may be sent in an off-line fashion.

If the media sent in real-time, when the callee's voicemail system 108-2 is connected to for the call, the callee's voicemail system 108-2 may initiate a call to the caller's voicemail system 108-1. The callee's voicemail system 108-2 may use information received from the call to determine how to reach the caller's voicemail system 108-1. For example, the caller's number may be received and used by the callee's voicemail system 108-2 to connect to the caller's voicemail system 108-1.

Once the connection is made, the media, as it is received from end device 102-1, is sent to the caller's voicemail system 108-1. Thus, a voicemail message is stored in the caller's voicemail system 108-1 in real-time as it is received.

For example, when the call ends or the voice message is left, and the connection has been disconnected with the caller's end device 102-1, the callee's voicemail system 108-2 may connect to the caller's voicemail system 108-1. The callee's voicemail system 108-2 may use the caller's number that was received in the connection or any other information that indicates how to connect to the caller's voicemail system 108-1. Thus, the caller's voicemail system 108-1 is connected to and the voicemail message that was recorded for the caller is then sent to it.

The caller can now access the voicemail message that was just left in the caller's voicemail message system 108-1. The voicemail message is sent to the caller's voicemail system 108-1 and stored automatically. For example, the callee's voicemail system 108-2 automatically determines how to connect to the caller's voicemail system 108-1 from information in the communication then automatically stores a copy of the voicemail message in the caller's voicemail system 108-1. No other actions are undertaken by the caller or callee to send a voicemail message in the off-line fashion to the caller's voicemail system 108-1.

Although the invention has been described with respect to specific embodiments thereof, these embodiments are merely illustrative, and not restrictive of the invention. Although certain devices are described as forking media, it will be recognized that any devices may perform the forking of the media, even the end devices.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for storing voicemail messages, the method comprising:
   detecting a connection from a caller device to a callee's voicemail system during a communication attempt, wherein the callee is not available to accept the communication attempt;
   receiving, in a communication system, media for the communication attempt, the media being received from the caller device, wherein the media from the caller device is sent to the callee's voicemail system to form a voicemail message for storage by the callee's voicemail system;
   automatically forking, by the communication system and in real-time, the media from the caller device to the caller's voicemail system to provide a copy of the voicemail message that is also being stored in the callee's voicemail system; and
   storing the forked media as the copy of the voicemail message in the caller's voicemail system in real-time as the media is being sent to the callee's voicemail system.

2. The method of claim 1, further comprising retrieving the stored forked media from the caller's voicemail system for forwarding the voicemail message to another user.

3. The method of claim 1, wherein the communication system that performs the forking is a voice communication system that is configured to route the media to the caller's voicemail system over a network.

4. The method of claim 3, wherein the voice communication system comprises a private branch exchange (PBX).

5. The method of claim 3, wherein the voice communication system comprises a device in an internet protocol (IP) network.

6. The method of claim 1, further comprising:
   detecting when a recording for the voicemail message is triggered by the callee's voicemail system; and
   starting the automatic forking upon the detection.

7. The method of claim 6, wherein detecting when the recording for the voicemail message is starting comprises detecting a signal from the callee's voicemail system indicating that the recording is starting.

8. The method of claim 7, wherein the signal comprises an audible sound.

9. The method of claim 1, further comprising detecting that the callee has become available and accepted the communication attempt during the storing of the voicemail message in the callee's voicemail system.

10. The method of claim 9, further comprising deleting the stored forked media copy of the voicemail message from the caller's voicemail system in response to the detection of the callee accepting the communication attempt.

11. An apparatus, comprising:
   one or more processors; and
   a memory containing instructions that, when executed by the one or more processors, cause the one or more processors to perform a set of steps comprising:
      detecting a connection from a caller device to a callee's voicemail system during a communication attempt, wherein the callee is not available to accept the communication attempt;
      receiving, in a communication system, media for the communication attempt, the media being received from the caller device, wherein the media from the caller device is sent to the callee's voicemail system to form a voicemail message for storage by the callee's voicemail system;
      automatically forking, by the communication system and in real-time, the media from the caller device to the caller's voicemail system to provide a copy of the voicemail message that is also being stored in the callee's voicemail system; and
      storing the forked media as the copy of the voicemail message in the caller's voicemail system in real-time as the media is being sent to the callee's voicemail system.

12. The apparatus of claim 11, wherein the instructions when executed further cause the one or more processors to perform retrieving the stored forked media from the caller's voicemail system for forwarding the voicemail message to another user.

13. The apparatus of claim 11, wherein the communication system that performs the forking is a voice communication system that is configured to route the media to the caller's voicemail system over a network.

14. The apparatus of claim 13, wherein the voice communication system comprises a private branch exchange (PBX).

15. The apparatus of claim 13, wherein the voice communication system comprises a device in an internet protocol (IP) network.

16. The apparatus of claim 11, wherein the instructions cause the one or more processors to perform further steps comprising:
   detecting when a recording for the voicemail message is triggered by the callee's voicemail system; and
   starting the automatic forking upon the detection.

17. The apparatus of claim 16, wherein detecting when the recording for the voicemail message is starting comprises detecting a signal from the callee's voicemail system indicating that the recording is starting.

18. The apparatus of claim 17, wherein the signal comprises an audible sound.

19. The apparatus of claim 11, wherein the instructions when executed further cause the one or more processors to perform detecting that the callee has become available and accepted the communication attempt during the storing of the voicemail message in the callee's voicemail system.

20. The apparatus of claim 19, wherein the instructions when executed further cause the one or more processors to perform deleting the stored forked media copy of the voicemail message from the caller's voicemail system in response to the detection of the callee accepting the communication attempt.

21. An apparatus, comprising:
   means for detecting a connection from a caller device to a callee's voicemail system during a communication attempt, wherein the callee is not available to accept the communication attempt;
   means for receiving, in a communication system, media for the communication attempt, the media being received from the caller device, wherein the media from the caller device is sent to the callee's voicemail system to form a voicemail message for storage by the callee's voicemail system;
   means for automatically forking, by the communication system and in real-time, the media from the caller device to the caller's voicemail system to provide a copy of the voicemail message that is also being stored in the callee's voicemail system; and
   means for storing the forked media as the copy of the voicemail message in the caller's voicemail system in real-time as the media is being sent to the callee's voicemail system.

\* \* \* \* \*